United States Patent
Wang

(10) Patent No.: US 7,990,648 B1
(45) Date of Patent: Aug. 2, 2011

(54) DISK DRIVE MARGINING READ CHANNEL USING PREDICTABLE DISTURBANCE SAMPLES GENERATED AS A FUNCTION OF A WRITTEN PATTERN

(75) Inventor: Alvin J. Wang, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 51 days.

(21) Appl. No.: 12/634,506

(22) Filed: Dec. 9, 2009

(51) Int. Cl.
*G11B 5/035* (2006.01)
(52) U.S. Cl. .............................. 360/65; 360/31; 360/66
(58) Field of Classification Search .................... None
See application file for complete search history.

(56) References Cited

U.S. PATENT DOCUMENTS

| | | | | |
|---|---|---|---|---|
| 5,168,413 A | * | 12/1992 | Coker et al. | 360/137 |
| 5,786,951 A | | 7/1998 | Welland et al. | |
| 6,731,443 B2 | | 5/2004 | Bliss et al. | |
| 6,771,442 B2 | | 8/2004 | Bliss et al. | |
| 7,372,651 B2 | | 5/2008 | Gunderson et al. | |
| 2002/0146070 A1 | * | 10/2002 | Lee | 375/233 |
| 2009/0002862 A1 | * | 1/2009 | Park et al. | 360/39 |

* cited by examiner

*Primary Examiner* — Jason C Olson

(57) ABSTRACT

A disk drive is disclosed comprising a head actuated over a disk having a plurality of tracks. A pattern is read from the disk to generate a read signal, and the read signal is sampled to generate read samples. Predictable disturbing samples are generated as a function of the pattern. The predictable disturbing samples are added to the read samples to generate disturbed samples, and a data sequence is detected from the disturbed samples.

24 Claims, 5 Drawing Sheets

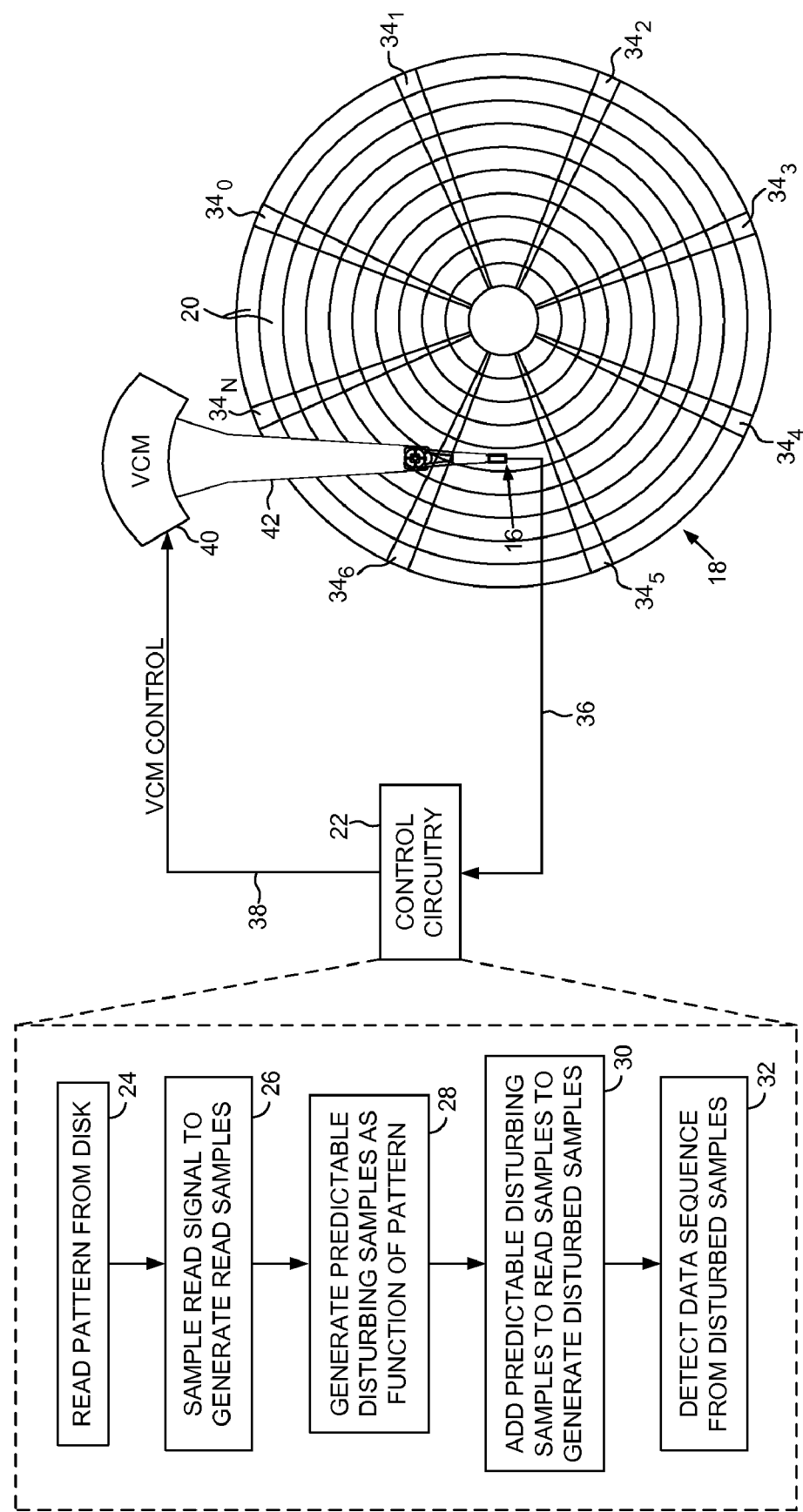

DISK DRIVE MARGINING READ CHANNEL USING PREDICTABLE DISTURBANCE SAMPLES GENERATED AS A FUNCTION OF A WRITTEN PATTERN

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 comprising a plurality of data tracks 4 defined by a number of servo sectors $6_0$-$6_N$ recorded around the circumference of each data track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

When reading data from the disk, a read channel typically samples the read signal to generate sample values that are equalized into a target response (e.g., a target partial response). A sequence detector (e.g., a Viterbi detector) detects an estimated data sequence from the equalized samples, and errors in the estimated data sequence are detected and corrected, for example, using a Reed-Solomon error correction code (ECC) or using a Low Density Parity Check (LDPC) code.

It is typically desirable to measure the performance of the disk drive in terms of bit error rate in order to qualify each disk drive as acceptable and/or calibrate various parameters of each disk drive (e.g., by selecting a data density or calibrating read channel parameters). Since the bit error rate of a Reed-Solomon ECC or LDPC decoder is typically very low, the prior art has suggested to margin the read channel during the quality test and or calibration procedures by adding random noise to the read signal or enhancing random noise in the read signal. However, adding or enhancing random noise in the read signal may not margin the read channel in a manner that reflects typical degradation of the read signal during normal operation. Therefore a disk drive that passes a quality test after adding random noise to the read signal may actually fail while deployed under normal operating conditions. Similarly, a calibration procedure that adds or enhances random noise in the read signal may end up selecting sub-optimal operating parameters.

BRIEF DESCRIPTION OF THE DRAWINGS

FIG. 2A shows a disk drive according to an embodiment of the present invention comprising a head actuated over a disk and control circuitry.

FIG. 2B is a flow diagram executed by the control circuitry according to an embodiment of the present invention wherein predictable disturbing samples are generated as a function of a pattern read from the disk.

DETAILED DESCRIPTION OF EMBODIMENTS OF THE INVENTION

Figure 1:
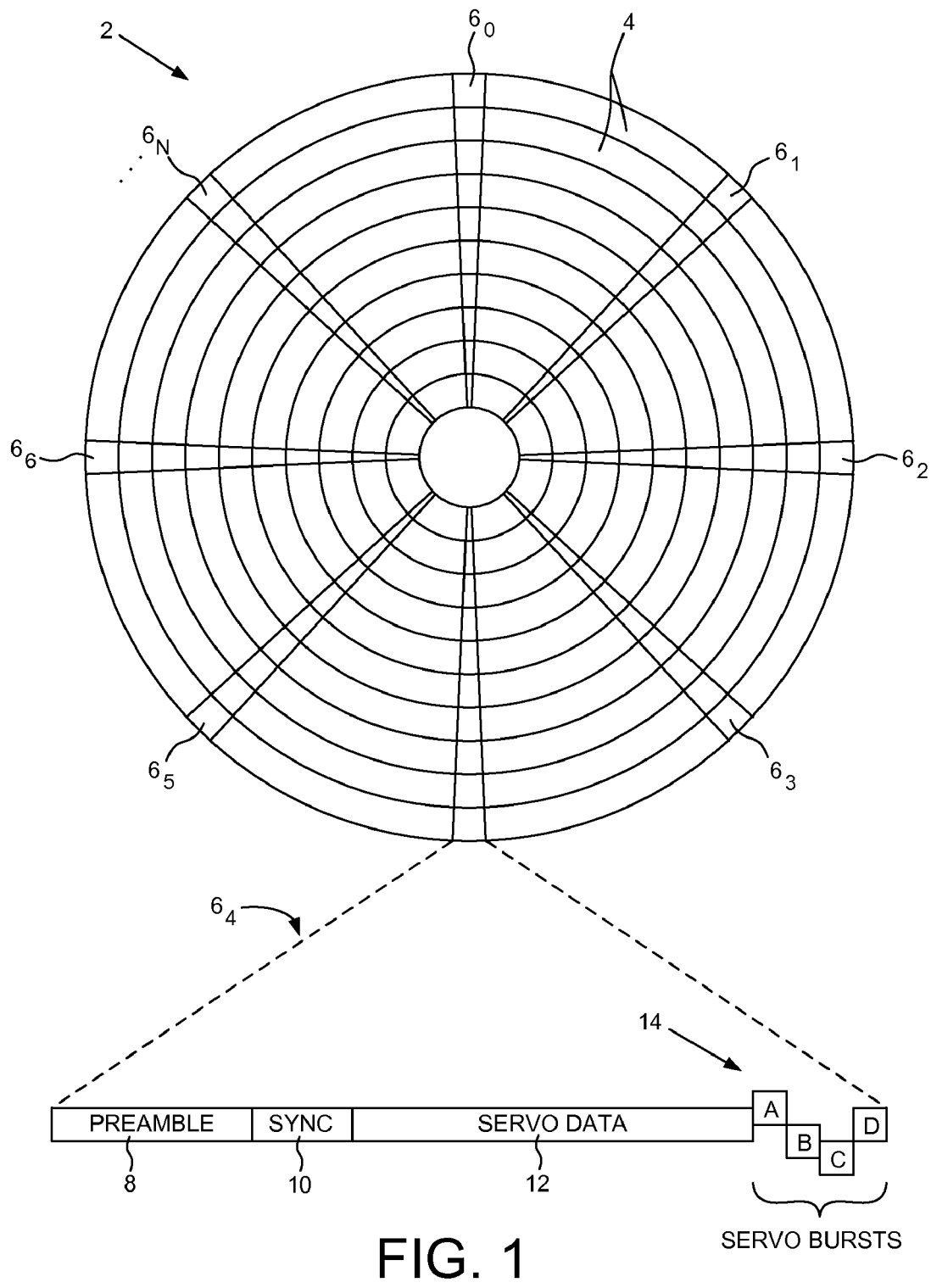
FIG. 1 shows a prior art disk format comprising a plurality of tracks defined by embedded servo sectors.

FIG. 2A shows a disk drive according to an embodiment of the present invention comprising a head 16 actuated over a disk 18 having a plurality of tracks 20. The disk drive further comprises control circuitry 22 for executing the flow diagram of FIG. 2B, wherein a pattern is read from the disk to generate a read signal (step 24) that is sampled to generate read samples (step 26). Predictable disturbing samples are generated as a function of the pattern (step 28). The predictable disturbing samples are added to the read samples to generate disturbed samples (step 30), and a data sequence is detected from the disturbed samples (step 32).

In the embodiment of FIG. 2A, the disk 18 comprises a plurality of servo sectors $34_0$-$34_N$ that define the plurality of tracks 20. The control circuitry 22 processes the read signal 36 to demodulate the servo sectors $34_0$-$34_N$ into a position error signal (PES). The PES is filtered with a suitable compensation filter to generate a control signal 38 applied to a voice coil motor (VCM) 40 which rotates an actuator arm 42 about a pivot in order to position the head 16 radially over the disk 18 in a direction that reduces the PES. The servo sectors $34_0$-$34_N$ may comprise any suitable position information, such as a track address for coarse positioning and servo bursts for fine positioning.

In one embodiment, the control circuitry 22 comprises a suitable read channel including a suitable sequence detector (e.g., a Viterbi detector) followed by a suitable error code decoder (e.g., a Reed-Solomon decoder or low-density parity code (LDPC) decoder). The detector/decoder algorithms are extremely accurate making it difficult to calibrate and/or qualify each disk drive in terms of the number of errors made (bit error rate). For example, calibrating read channel parameters (such as equalizer coefficients) based on bit error rate requires an unacceptable amount of time before a bit error rate can be discerned. Therefore, in one embodiment of the present invention the read channel is "margined" by adding predictable disturbing samples to the read signal samples. The predictable disturbing samples essentially stress the components of the read channel so as to increase the bit error rate, thereby reducing the time required to calibrate and/or qualify the disk drive.

Figure 3A:
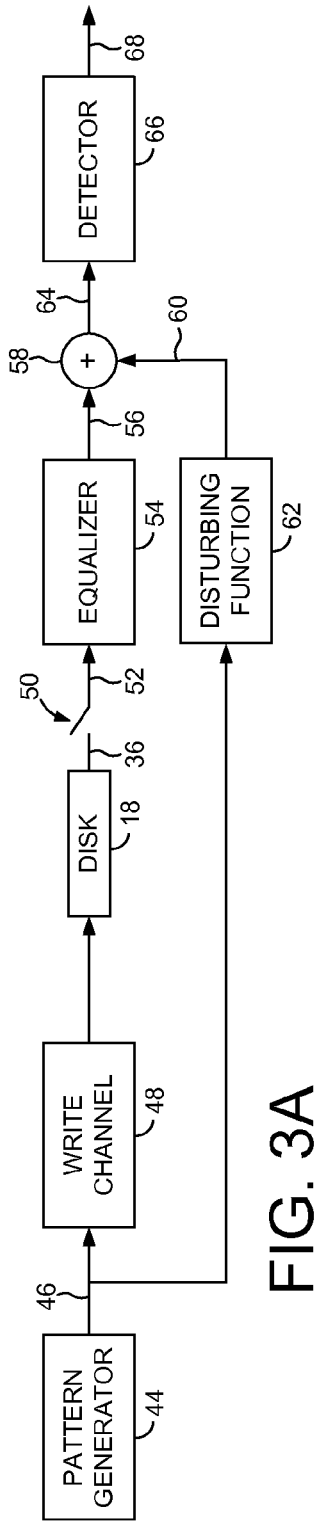
FIG. 3A shows control circuitry according to an embodiment of the present invention wherein the predictable disturbing samples are added to equalized samples.

FIG. 3A shows control circuitry according to an embodiment of the present invention wherein a pattern generator 44 generates a pattern 46 input into a write channel 48 which modulates a write current in the head 16 in order to write the pattern to the disk 18. Upon read back, a sampling device 50 samples the read signal 36 to generate read samples 52 which are equalized into a target response (e.g., partial response) by an equalizer 54. The equalized read samples 56 are added 58 to predictable disturbing samples 60 generated by a disturbing function 62. The disturbing function 62 generates the predictable disturbing samples 60 as a function of the pattern 46 (as generated by the pattern generator 44 in the embodiment of FIG. 3A). The resulting disturbed samples 64 are processed by a suitable sequence detector 66 to generate an estimated data sequence 68.

Figure 3B:
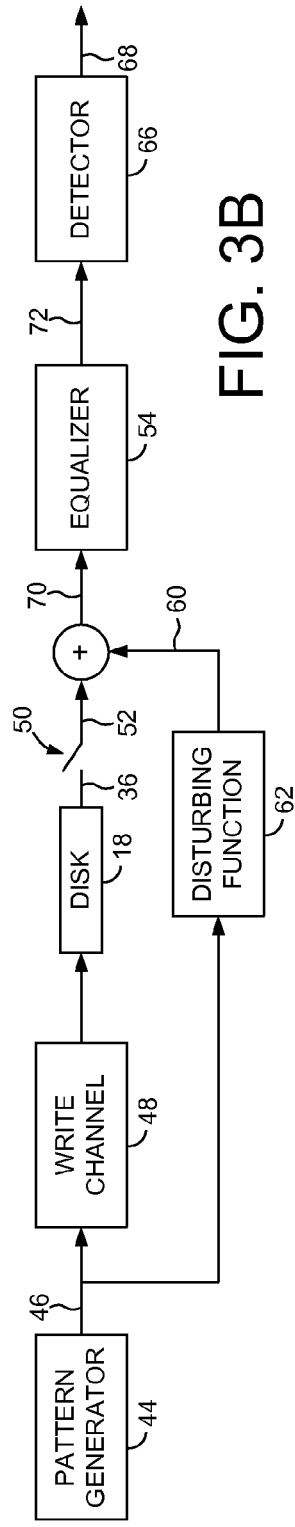
FIG. 3B shows control circuitry according to an embodiment of the present invention wherein the predictable disturbing samples are added to the read samples prior to equalization.

The predictable disturbing samples 60 may be added to the read samples at any suitable point along the read channel path. In an embodiment shown in FIG. 3B, the predictable disturbing samples 60 are added 58 to the read samples 52 in front of the equalizer 54. The disturbed samples 70 are then equalized 54 and the equalized samples 72 processed by the sequence detector 66. In one embodiment, the predictable disturbing samples 60 may be added at multiple points along the read channel path (e.g., as shown in FIGS. 3A and 3B) either simultaneously, or serially where the serial results may be averaged (to calibrate and/or qualify the disk drive).

The pattern generator 44 may comprise any suitable circuitry, such as a microprocessor operating under a control program, or a dedicated circuit that generates a predetermined pattern. Since the predetermined pattern is known, the disturbing samples used to disturb the read samples are predictable. Because the disturbing samples are generated as a predictable function of the pattern, they can be manipulated to better emulate disturbances typically seen in the magnetic recording channel.

Figure 3C:
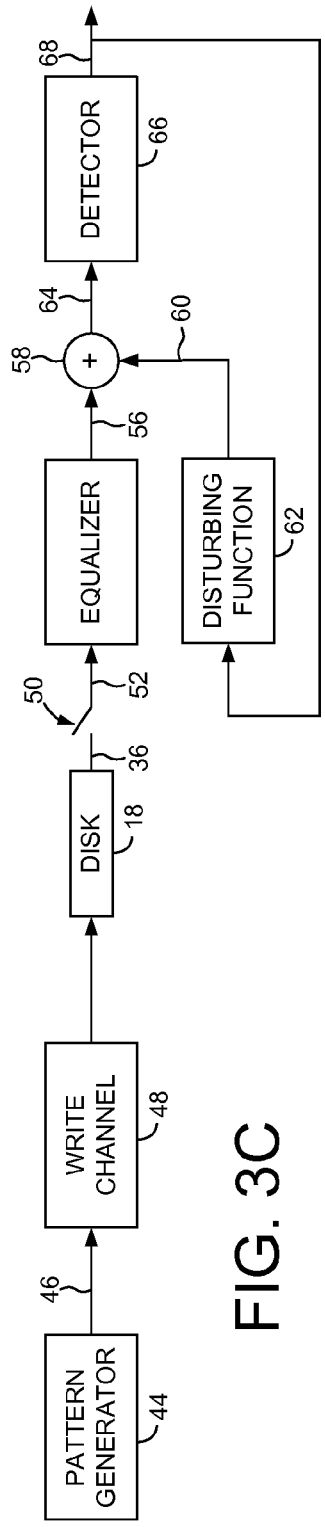
FIG. 3C shows control circuitry according to an embodiment of the present invention wherein a periodic pattern is written to and read from the disk in order to generate the predictable disturbing samples as a function of the output of a sequence detector.

In the embodiment of FIG. 3A, the pattern generator 44 generates the pattern 46 synchronous with reading the pattern written to the disk so that the predictable disturbing samples 60 correspond to the read samples 52. In an alternative embodiment shown in FIG. 3C, the pattern generator 44 generates a periodic pattern (e.g., a 2T pattern) written to the disk 18. During the read operation, the estimated data sequence 68 output by the sequence detector 66 is processed by the disturbing function 62 to generate the predictable disturbing samples 60. In this embodiment, the periodicity of the pattern 46 allows the predictable disturbing samples 60 to correlate with the read samples 52 even though there is a delay in detecting the data sequence 68. For example, in one embodiment the delay comprises an integer number of cycles in the periodic pattern so that the phase of the predictable disturbing samples 60 aligns with the phase of the read samples 56.

Figure 4A:
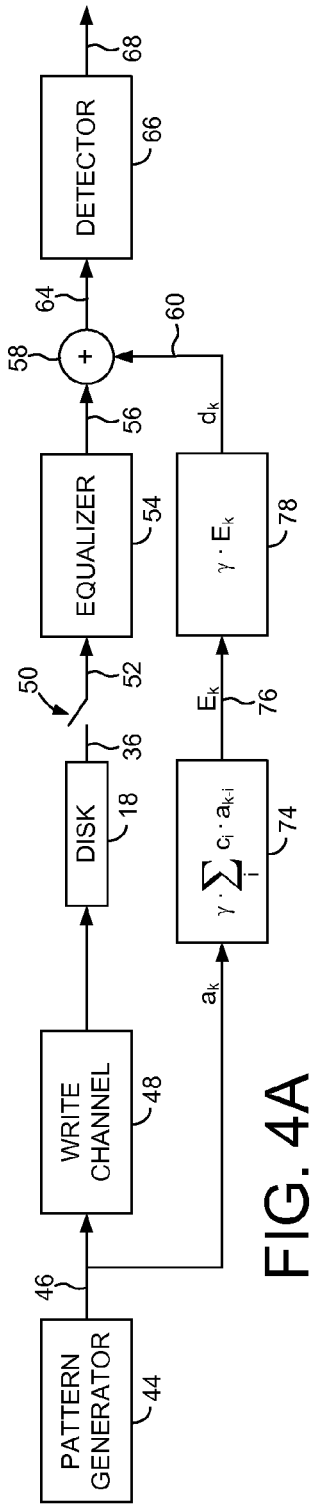
FIG. 4A shows control circuitry according to an embodiment of the present invention wherein the predictable disturbing samples are generated by scaling expected samples generated as a function of the pattern read from the disk.

Any suitable disturbing function 62 may be employed in the embodiments of the present invention. In an embodiment shown in FIG. 4A, the disturbing function 62 comprise an expected sample generator 74 that emulates the transfer function of the recording channel to generate expected samples 76 according to a target response (e.g., a partial response). If the recording channel operates according to a PR4 response, the expected sample generator 74 may comprise a filter of the form $1-D^2$ for filtering the pattern 46 to generate the expected samples 76 (where the pattern 46 comprises symbols in the set $\{+1,-1\}$). The expected samples $E_k$ 76 are generated by convolving the pattern symbols $a_k$ 46 with a dipulse response of the recording channel (e.g., a filter of the form $1-D^2$ for a PR4 channel). The expected samples $E_k$ 76 are scaled using a suitable scalar $\gamma$ 78 to generate the predictable disturbing samples $d_k$ 60.

Figure 4B:
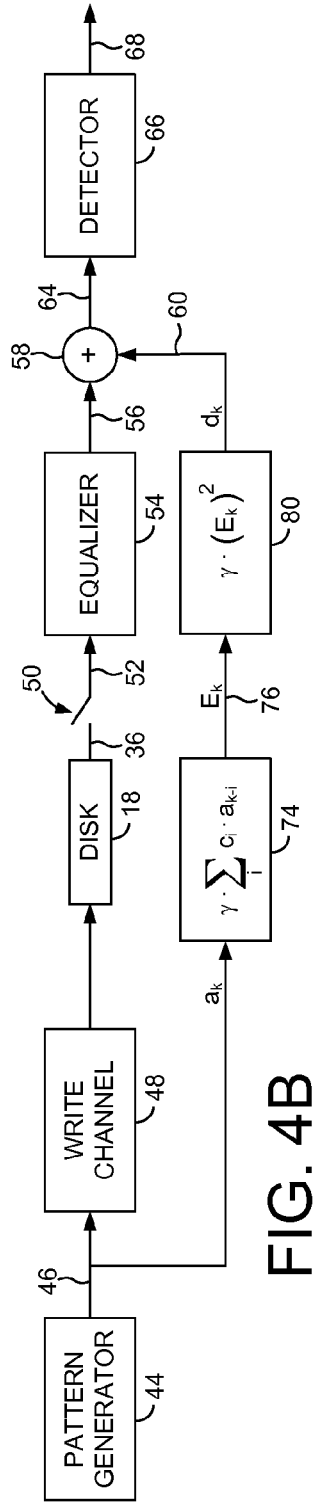
FIG. 4B shows control circuitry according to an embodiment of the present invention wherein the predictable disturbing samples are generated by squaring the expected samples.

FIG. 4B shows an example embodiment wherein the predictable disturbing samples $d_k$ 60 are generated by scaling the square 80 of the expected samples $E_k$ 76. In one embodiment, squaring the expected samples $E_k$ 76 emulates a non-linear distortion that a magnetoresistive (MR) head may exhibit referred to as magneto-resistive asymmetry (MRA).

Figure 4C:
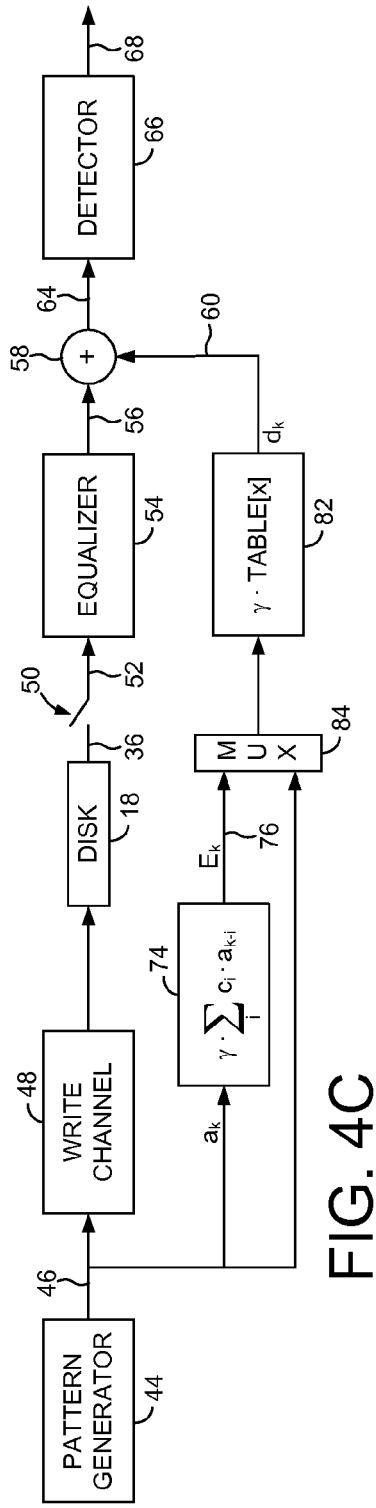
FIG. 4C shows control circuitry according to an embodiment of the present invention wherein the predictable disturbing samples are generated by indexing a lookup table.

FIG. 4C shows an embodiment of the present invention wherein the predictable disturbing samples 60 are generated by indexing a lookup table 82. In one embodiment, the expected samples $E_k$ 76 are used to index the lookup table 82, and in another embodiment, the symbols in the pattern 46 are used to index the lookup table 82 (as configured by a multiplexer 84). The lookup table 82 may emulate any suitable disturbance typically seen in a magnetic recording channel, including a data dependent disturbance such as jitter bias in the sequence detector 66 or data dependent base-line wander. Other damaging disturbances emulated by the lookup table may include adjacent track interference (ATI), a defect on the disk, a sampling timing error, circuit saturation effect, etc.

Figure 5A:
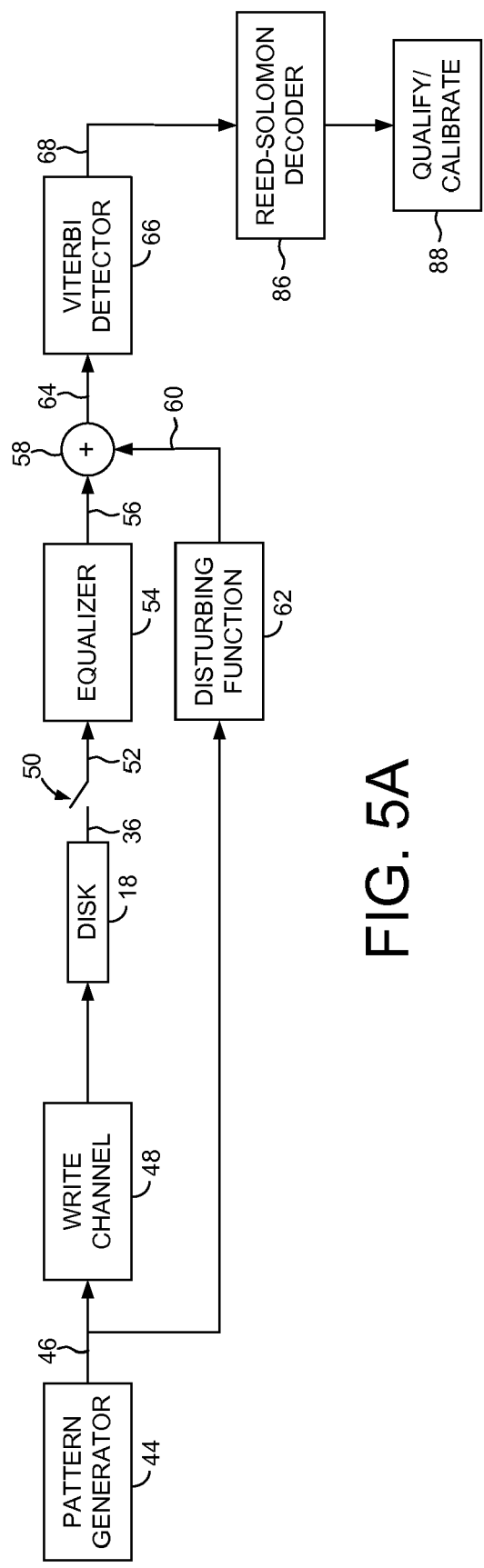
FIG. 5A shows control circuitry according to an embodiment of the present invention wherein a Viterbi detector outputs a detected data sequence decoded by a Reed-Solomon decoder.
Figure 5B:
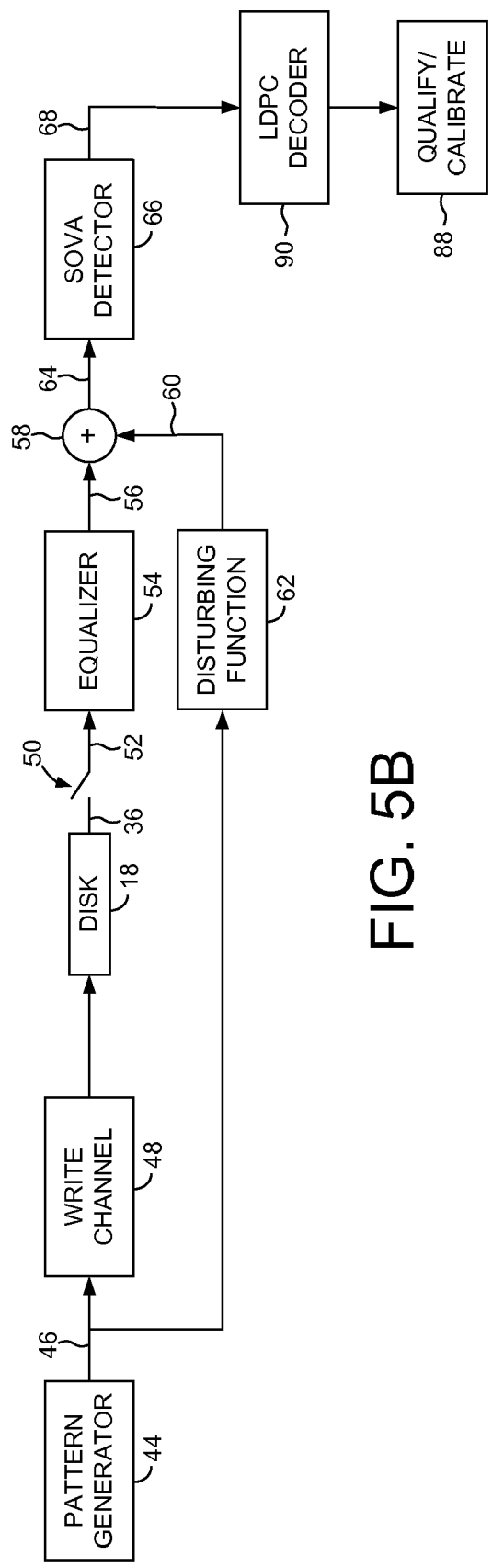
FIG. 5B shows control circuitry according to an embodiment of the present invention wherein a soft-output Viterbi detector outputs probability metrics of an estimated data sequence decoded by a low-density parity-code (LDPC) decoder.

In one embodiment, the estimated data sequence 68 output by the sequence detector 66 may be evaluated in order to calibrate and/or qualify the read channel. For example, the estimated data sequence 68 may be compared to the known pattern in order to generate a bit error rate used for calibration and/or qualification. In another embodiment shown in FIG. 5A, the sequence detector comprises a Viterbi sequence detector 66 which outputs a binary data sequence 68 decoded by a Reed-Solomon decoder 86, wherein an output of the Reed-Solomon decoder 86 may be used to calibrate and/or qualify 88 the disk drive (e.g., the Reed-Solomon decoder may output a detected number of symbol errors). In yet another embodiment shown in FIG. 5B, the sequence detector may implement a soft-output Viterbi algorithm (SOVA) 66 which outputs probability metrics that are processed by a low-density parity-code (LDPC) decoder 90, wherein an output of the LDPC decoder 90 may be used to calibrate and/or qualify 88 the disk drive.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk; and
   control circuitry operable to:
      read a pattern from the disk to generate a read signal;
      sample the read signal to generate read samples;
      generate predictable disturbing samples as a function of the pattern;
      add the predictable disturbing samples to the read samples to generate disturbed samples; and
      detect a data sequence from the disturbed samples.

2. The disk drive as recited in claim 1, wherein the control circuitry is further operable to:
   generate expected samples as a function of the pattern, wherein the expected samples correspond to the read samples; and
   generate the predictable disturbing samples as a function of the expected samples.

3. The disk drive as recited in claim 1, wherein the control circuitry is further operable to equalize the read samples according to a target response and add the predictable disturbing samples to the equalized read samples.

4. The disk drive as recited in claim 1, wherein the control circuitry is further operable to equalize the disturbed samples prior to detecting the data sequence.

5. The disk drive as recited in claim 1, wherein the control circuitry is further operable to write the pattern to the disk.

6. The disk drive as recited in claim 1, wherein the control circuitry is further operable to generate the predictable disturbing samples as a function of the detected data sequence.

7. The disk drive as recited in claim 2, wherein the control circuitry is further operable to scale the expected samples to generate the predictable disturbing samples.

8. The disk drive as recited in claim 2, wherein the control circuitry is further operable to square the expected samples to generate the predictable disturbing samples.

9. The disk drive as recited in claim 2, wherein the control circuitry is further operable to index a lookup table using the expected samples to generate the predictable disturbing samples.

10. The disk drive as recited in claim 9, wherein the lookup table simulates at least one of adjacent track interference, a defect on the disk, and a sampling timing error.

11. The disk drive as recited in claim 1, wherein the control circuitry is further operable to index a lookup table using the pattern to generate the predictable disturbing samples.

12. The disk drive as recited in claim 11, wherein the lookup table simulates a baseline wander.

13. A method of operating a disk drive comprising a head actuated over a disk including a plurality of tracks, the method comprising:
   reading a pattern from the disk to generate a read signal;
   sampling the read signal to generate read samples;
   generating predictable disturbing samples as a function of the pattern;
   adding the predictable disturbing samples to the read samples to generate disturbed samples; and
   detecting a data sequence from the disturbed samples.

14. The method as recited in claim 13, further comprising:
   generating expected samples as a function of the pattern, wherein the expected samples correspond to the read samples; and
   generating the predictable disturbing samples as a function of the expected samples.

15. The method as recited in claim 13, further comprising equalizing the read samples according to a target response and adding the predictable disturbing samples to the equalized read samples.

16. The method as recited in claim 13, further comprising equalizing the disturbed samples prior to detecting the data sequence.

17. The method as recited in claim 13, further comprising writing the pattern to the disk.

18. The method as recited in claim 13, further comprising generating the predictable disturbing samples from the detected data sequence.

19. The method as recited in claim 14, further comprising scaling the expected samples to generate the predictable disturbing samples.

20. The method as recited in claim 14, further comprising squaring the expected samples to generate the predictable disturbing samples.

21. The method as recited in claim 14, further comprising indexing a lookup table using the expected samples to generate the predictable disturbing samples.

22. The method as recited in claim 21, wherein the lookup table simulates at least one of adjacent track interference, a defect on the disk, and a sampling timing error.

23. The method as recited in claim 13, further comprising indexing a lookup table using the pattern to generate the predictable disturbing samples.

24. The method as recited in claim 23, wherein the lookup table simulates a baseline wander.

* * * * *